US006837586B2

(12) United States Patent
Rhoads (10) Patent No.: US 6,837,586 B2
(45) Date of Patent: Jan. 4, 2005

(54) RING OPTICAL INTERFEROMETER

(76) Inventor: Geoffrey B. Rhoads, 2961 SW. Turner Rd., West Linn, OR (US) 97068

( * ) Notice: Subject to any disclaimer, the term of this patent is extended or adjusted under 35 U.S.C. 154(b) by 1 day.

(21) Appl. No.: 10/601,343

(22) Filed: Jun. 20, 2003

(65) Prior Publication Data

US 2004/0051878 A1 Mar. 18, 2004

Related U.S. Application Data

(63) Continuation-in-part of application No. 10/179,478, filed on Jun. 24, 2002, now abandoned, and a continuation-in-part of application No. 10/178,047, filed on Jun. 21, 2002, now Pat. No. 6,726,339.
(60) Provisional application No. 60/347,384, filed on Jan. 9, 2002.

(51) Int. Cl.[7] .............................................. G02B 7/182
(52) U.S. Cl. ........................ 359/872; 359/873; 359/577
(58) Field of Search ............................... 359/872–873, 359/857–859, 577, 850, 351, 399, 419, 429; 356/121, 141; 250/201.9; 248/346.3, 476; 126/600–604, 439

(56) References Cited

U.S. PATENT DOCUMENTS

| 4,424,802 A | 1/1984 | Winders ..................... 126/575 |
| 4,981,354 A | 1/1991 | DeHainaut et al. ...... 356/139.1 |
| 5,108,168 A | 4/1992 | Norbert et al. ............. 359/419 |
| 5,120,128 A | 6/1992 | Ulich et al. ................. 356/121 |
| 5,229,889 A | 7/1993 | Kittell ........................ 359/849 |
| 5,730,117 A | 3/1998 | Berger ........................ 126/604 |
| 5,905,591 A | 5/1999 | Duncan et al. ............. 359/399 |
| 6,084,227 A | 7/2000 | Rhoads ..................... 250/201.9 |

Primary Examiner—Mohammad Sikder
(74) Attorney, Agent, or Firm—Stoel Rives LLP (57) ABSTRACT

A multi-aperture interferometric optical system collects light propagating from a source of light and develops overlapping diffraction patterns on an optical detector that produces output signals for processing to form an image corresponding to the diffraction patterns. A preferred embodiment of the invention is a large aperture orbiting, earth-watching ring interferometric optical system configured such that there is no macro-structure pointing. Four mirror-ring structures direct incoming light to a multi-spectral primary optical detector that acquires light-pattern information from which an image can be derived.

13 Claims, 9 Drawing Sheets

RING OPTICAL INTERFEROMETER

RELATED APPLICATIONS

This is a continuation-in-part of U.S. patent application Ser. Nos. 10/179,478 and 10/178,047, filed Jun. 24, 2002, now abandoned, and Jun. 21, 2002, now U.S. Pat No. 6,726,339, respectively, both of which claim benefit of U.S. Provisional Patent Application No. 60/347,384, filed Jan. 9, 2002.

TECHNICAL FIELD

This invention relates to large aperture optical systems adapted to form high resolution images of distant extended scenes and, in particular, to a multi-aperture interferometric optical system that collects light propagating from a source of light and develops a diffraction pattern on an optical detector that produces output signals for processing to form an image corresponding to the diffraction pattern.

BACKGROUND OF THE INVENTION

The theoretical advantages of placing telescopes above the distorting atmosphere have been well known and practically pursued for about four or more decades. Briefly stated, these advantages include sharper images and accessibility to a broader range of wavelengths. The Hubble Space Telescope and NASA's upcoming NGST (Next Generation Space Telescope) are particularly well known examples of spaceborne telescopes. Remote sensing satellites beginning with Landsat and Spot, and more recently systems launched and operated by Space Imaging, Digital Globe, and Orbimage, represent earth-pointing examples of telescopes, known to skilled persons as "large aperture cameras." There are, likewise, but slightly less well known, similar advantages to placing optical interferometers into space. Examples of such systems include NASA's SIM (Space Interferometry System) and SIRTF (Space Infrared Telescope Facility).

In many respects, telescopes and optical interferometers are designed with the same result in mind, namely, to measure the optical energy distribution of a spatial "scene" or of some "object." Telescopes do so by forming a single image of an object or a scene, whereas optical interferometers explicitly measure the amplitude and phase of specific spatial frequencies of an object or a scene. Both devices can do so across a range of bands in the spectral dimension. By post-processing images derived from telescopes, one can readily obtain interferometer-like spatial frequency measurements; and by post-processing data from an optical interferometer, one can readily obtain telescope-like images, especially if a complete set of spatial frequencies has been measured.

A form of telescope implemented with non-full apertures was introduced and practically pursued before, but achieved popularity during the 1980s. Such telescopes are referred to as "sparse array," "phased array," or "multi-aperture" telescopes. The basic notion of sparse array telescope design is to "coherently combine" several smaller telescopes, or sub-apertures, to achieve the resolving capabilities of a much larger telescope. An example of a multi-aperture imaging system is described in U.S. Pat. No. 6,905,591 for Multi-Aperture Imaging System. The premise underlying the operation of sparse array telescopes is that the spatial autocorrelation function of any given mirror configuration containing no drop-out points ("nulls" in spatial frequency space) achieves telescopic "imaging" or "full-coverage spatial frequency" optical interferometry in the absence of monolithic (or pseudo-monolithic, segmented) mirrors. Such a mirror configuration reduces cost and complexity. The accepted cost of implementing this relatively inexpensive approach is a reduction in light gathering capability, hence resulting in higher effective f/numbers and longer exposure times. The intended result is that much larger telescopes could be contemplated and built, thereby increasing the resolution of state of the art systems within acceptable cost budgets dictated by public security concerns and scientific endeavor priorities.

The cost virtues of sparse array telescopes have been and are now duly extolled and elucidated. At the same time, a number of various specific designs that attend to the unique design challenges presented by very large, space-based structures have been presented and sometimes implemented, at least in simulations. Noteworthy among these challenges is the need to position many optical mirrors to accuracies initially approaching and usually much finer than the wavelengths of visible light. This challenge has been referred to as "phasing" or what most people would call "maintaining focus." Moreover, the long-established optical interferometric principle of pointing only the sub-apertures (i.e., not the whole structure) and allowing delay lines to maintain coherence is a clear design requirement for most, if not all, realistic approaches to 10-meter and larger outside-aperture class systems. In addition to the generic and given requirements for a sparse array telescope, various provisions have been envisioned, built, and tested in structures that are to be initially compactly stowed in a given structure for launch and later deployed into an operational configuration.

All of the foregoing basic requirements were well described in the 1980s, and a wide variety of specific design implementations approaching these requirements have ensued. With only a few exceptions, which tend to be classic optical interferometers in character, the sheer cost and complexity of actually building, testing, launching, and operating sparse array telescopes have, to date, permitted production of no known operational system. It has generally been found that actual structural implementation of these conceptual designs is far more difficult than simply describing the now well-understood theoretical requirements that the work of the 1980s and 1990s outlined.

SUMMARY OF THE INVENTION

The present invention embodies an overall functional approach to the design and construction of very large sparse array telescopes in the form of a multi-aperture interferometric optical system. The invention implements an approach that explicitly negates the classic telescope design notion of forming a singular image through coherent beam combination, which works well in a laboratory at smaller scales. The invention implements a field-variant object-space sampling approach much more akin to wide-field wavefront-estimate-assisted speckle imaging through a turbulent atmosphere, as described in U.S. Pat. No. 6,084,227 for Method and Apparatus for Wide Field Distortion Compensated Imaging ('227 patent), on which applicant is named as inventor. This technique treats a very large structure as though it were just another kind of atmosphere, albeit an "atmosphere" that is in general a little better behaved than the one earth-bound astronomers have been considering for centuries.

Stated in simpler terms, the invention does not implement an attempt to beam-combine a singular image onto an electronic sensor or light sensitive film under the expensive assumption that one has physically forced a large structure to maintain nanometer-scale intra-positional accuracies. The invention instead expects and accepts major perturbations in the large physical structure that collects optical energy from an object or a scene and interprets the electronically sensed data (what classic telescope principles might term "gross distortions," and what classic optical interferometry might term "very complicated biasing in time, space, spatial amplitude and phase") with reference to its known errors (or knowable biases). The price for this approach is the same as that paid to examine sparse array designs, namely, exposure time and the time-efficiency of imaging static and dynamic objects. The objective of this approach is also the same, which is the design of a large system that is practicable and operable within acceptable budgets.

A preferred embodiment of the invention is a large aperture orbiting, earth-watching ring interferometric optical system using 23 nominally identical commercial-off-the-shelf (COTS)-grade convex primary mirrors. The nominal orbit of the optical is geo-synchronous, with designed ground resolution of approximately 0.8 meter at 500 nanometers. The optical system is configured such that there is no macro-structure pointing; the primary mirrors are responsible for gross target pointing. Secondary, tertiary, and quaternary mirror ring structures receive light reflected by the primary mirrors and steer the reflected light to a detector plane, where a multi-spectral primary optical detector is positioned. There are 23 mirror arms defined by a primary mirror and corresponding secondary, tertiary, and quaternary mirrors that direct the incoming light along a path to the primary optical detector. The design approach of the preferred embodiment described uses a linear piston system in association with the tertiary mirrors to perform most of the optical path length (OPL) equalization and tip/tilt devices in association with the secondary and quaternary mirrors to perform most of the equalization to make common the effective focal lengths and focal planes of each of the mirror arms of the optical system. An alternative embodiment uses a single quaternary mirror in association with tip/tilt and linear piston positioning systems as a trade-off for more complicated positioning systems for the secondary and tertiary ring structures.

Initial and ongoing phasing is achieved through optical detector feedback loops into either the secondary or tertiary mirrors. The multi-spectral primary optical detector includes four detector elements, each viewing a 20 nanometer-50 nanometer bandpass image, tunable over the visible through near-IR spectrum. The overall "instantaneous but rapidly changing" wavefront error budget is on the order of one wavelength (or even worse), rather than the more traditional one-tenth wavelength.

Additional objects and advantages of this invention will be apparent from the following detailed description of a preferred embodiment thereof, which proceeds with reference to the accompanying drawings.

DETAILED DESCRIPTION OF A PREFERRED EMBODIMENT

Figure 1:
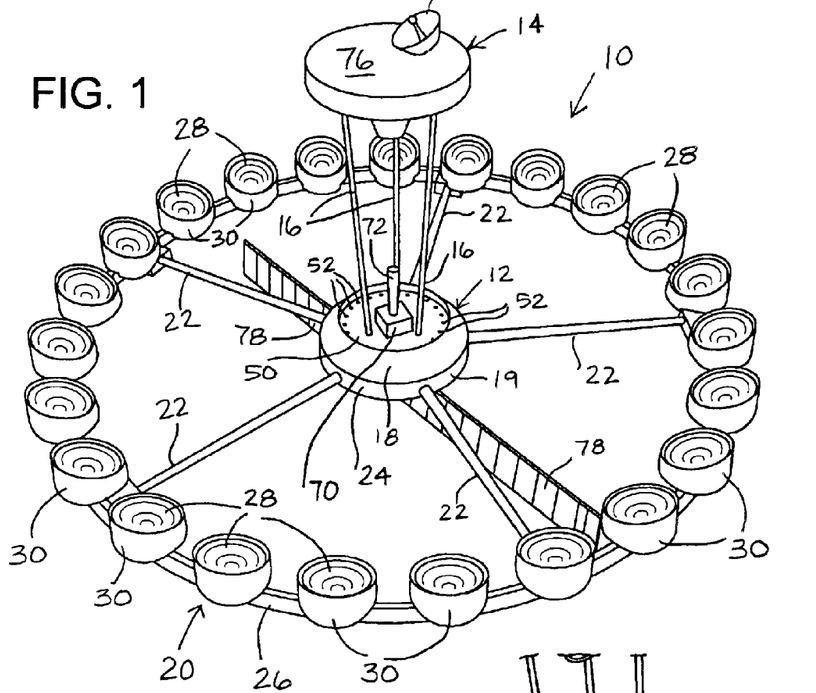
FIG. 1 is an isometric view of a preferred embodiment of an orbiting multi-aperture interferometric optical system of the present invention.
Figure 2:
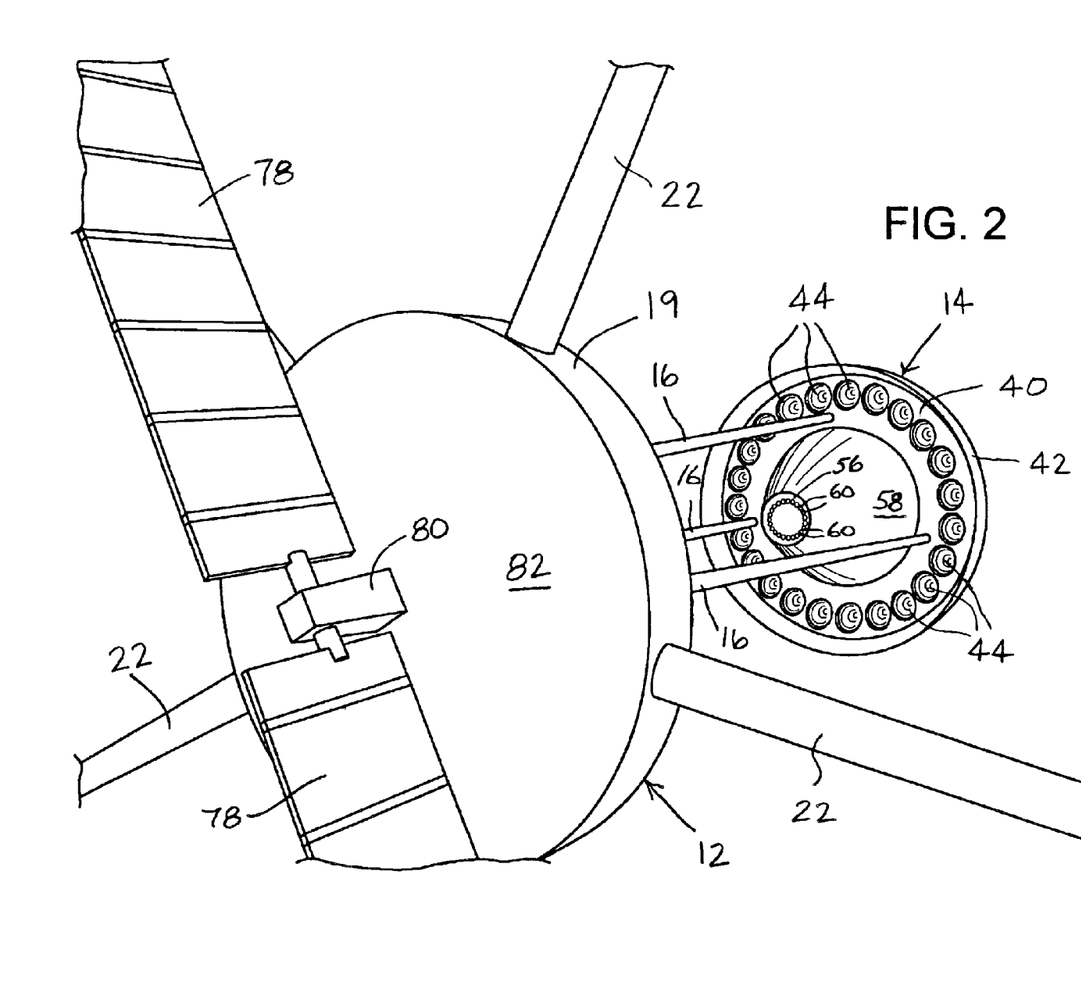
FIG. 2 is an enlarged, fragmentary rearward view of the optical system of FIG. 1.

FIGS. 1 and 2 show an isometric view and an enlarged, fragmentary rearward view, respectively, of a preferred embodiment of an orbiting multi-aperture interferometric optical system 10 constructed in accordance with the invention. With reference to FIGS. 1 and 2, optical system 10 is composed of a main body in the form of a central hub 12 and a secondary assembly in the form of a plate structure 14 spaced apart from each other by connection to the opposite ends of three cylindrical columns 16. Central hub 12 is composed of two separate cylindrical structures 18 and 19, the larger structure 18 containing most of the satellite equipment and the smaller structure 19 providing an anchor for a primary mirror structure 20 and containing a multi-spectral primary optical detector. Four mirror ring structures, two each connected to central hub 12 and plate structure 14, direct incoming light to the multi-spectral primary optical detector positioned at a detector plane on central hub 12.

FIG. 1 shows that central hub 12 is connected to primary mirror structure 20 by five cylindrical support rods 22 radially extending from a main fairing 24 of cylindrical structure 19 of central hub 12 to a ring truss 26. Ring truss 26 supports 23 primary mirrors 28, each set within a cup-shaped fairing 30. FIG. 2 shows an inner surface 40 of plate structure 14 encircled by an annular secondary fairing 42 and supporting 23 secondary mirrors 44 spaced apart along the periphery of plate structure 14. Secondary mirrors 44 are positioned such that their light reflecting surfaces confront those of primary mirrors 28.

FIG. 1 shows that a recessed top surface 50 of cylindrical structure 18 of central hub 12 supports 23 tertiary mirrors 52 positioned spaced apart along the periphery of top surface 50 near main fairing 24. FIG. 2 shows that a periphery 56 of an open-ended conical support member 58 attached to inner surface 40 of plate structure 14 supports 23 quaternary mirrors 60. Skilled persons will appreciate that light baffles and shields for the mirrors would be incorporated in an on-orbit optical system. Such baffles and shields would obscure the mirrors shown in the drawings and, therefore, are omitted from them.

FIG. 1 shows a box containing the multi-spectral primary optical detector 70, which is preferably a component of a camera system, mounted at the center of top surface 50 of central hub 12. A tube 72 extending outwardly from the box toward inner surface 40 of plate structure 14 functions as a light baffle for camera system 70. A high gain communication antenna 74 for transmitting and receiving data and control signals from a remote station is mounted on a bottom surface 76 of plate structure 14. Two solar power panels 78 extend radially outwardly from a support member 80 of a bottom surface 82 of cylindrical structure 19.

Figure 3:
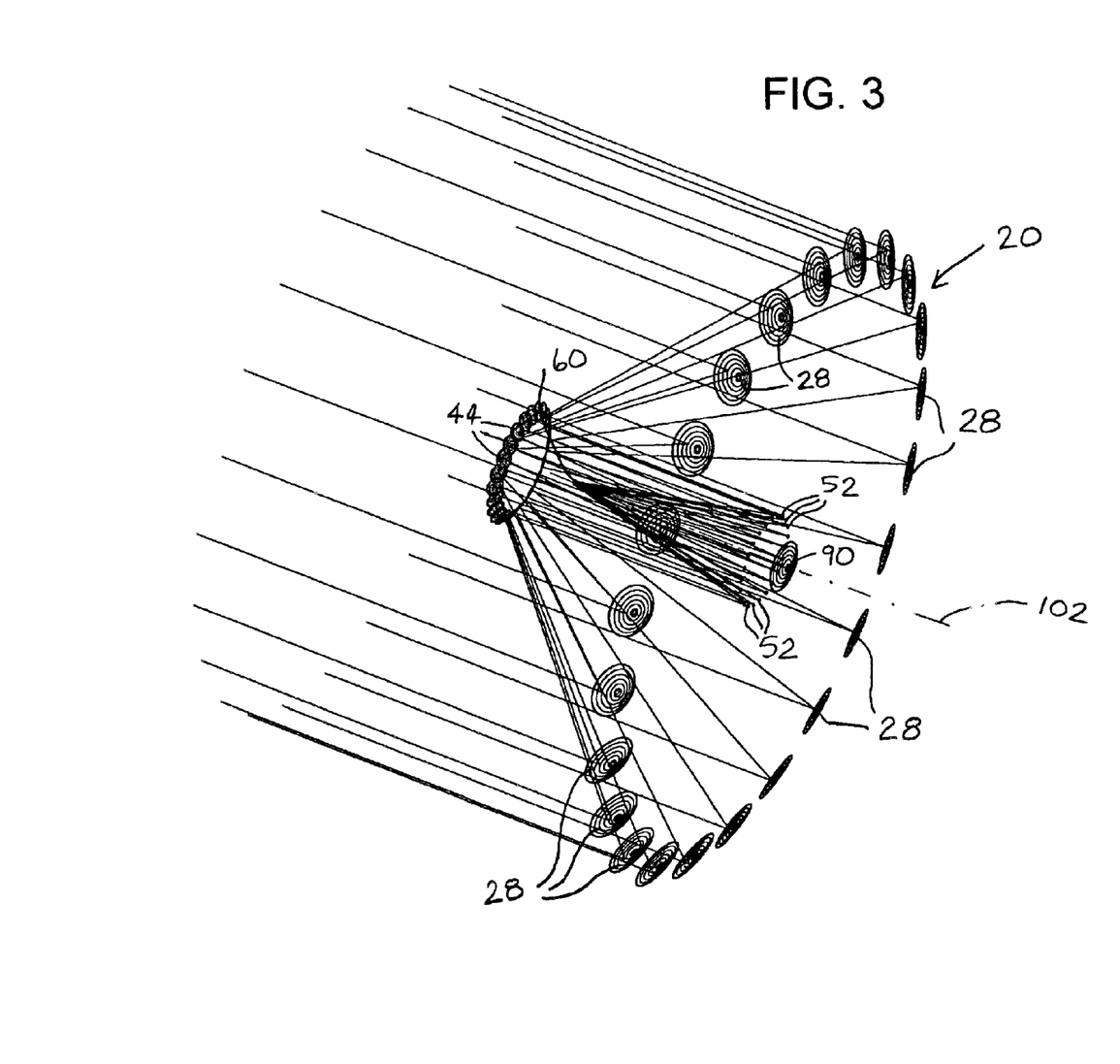
FIG. 3 is a diagram showing a perspective view of a preferred embodiment of a ring optical interferometer designed in accordance with the present invention.
Figure 4:
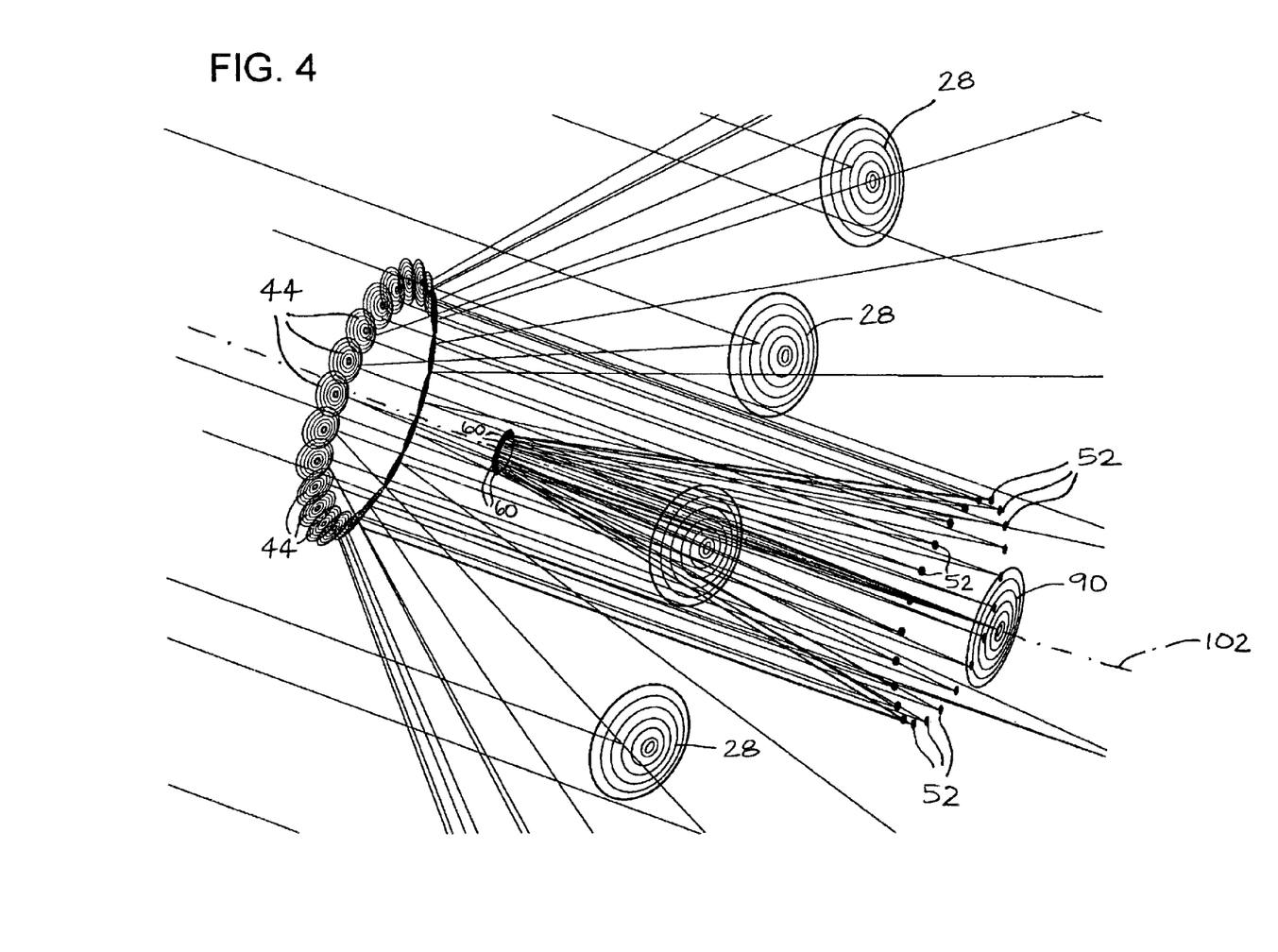
FIG. 4 is an enlarged fragmentary view of the ring optical interferometer of FIG. 3 showing the optical paths of incoming light converging to form a diffraction pattern at a detector plane.

FIGS. 3 and 4 show a preferred embodiment of multi-aperture interferometric optical system 10 that is formed of four ring structures, each including a set of mirrors cooperating to steer incoming light to form a coherent diffraction pattern on a light receiving surface of camera system 70. The overall effective focal length of this embodiment of optical system 10 is 900 meters. With particular reference to FIGS. 1 and 3, an outermost, primary ring structure 20 supports 23 1-meter diameter primary mirrors 28 mutually spaced apart along a 25-meter diameter ring truss 26, which defines a periphery around which primary mirrors 28 are arranged. Primary mirrors 28 are preferably positioned on ring truss 26 in a slightly asymmetric manner in which certain neighboring pairs of primary mirrors are spaced apart by center-to-center distances of either greater than or less than 2 meters. This asymmetric spacing tends to produce more uniform UV plane signal coverage.

With particular reference to FIGS. 2 and 4, 23 15-centimeter diameter secondary mirrors 44 are mutually spaced apart along a 3.5-meter diameter plate structure 14; 23 tertiary mirrors 52 of between about 8 centimeters and 9 centimeters in diameter are mutually spaced apart along a 3.5-meter diameter top surface 50 of cylindrical structure 18; and 23 quaternary mirrors 60 of between about 1 centimeter and 2 centimeters in diameter are mutually spaced apart along periphery 56 of a 0.4-meter diameter conical support member 58. (The ranges indicated for the diameters of the tertiary and quaternary mirrors provide for an optical designer flexibility to optimize the overall system design.) Plate structure 14, top surface 50, and conical support member 58 define the peripheries around which secondary mirrors 44, tertiary mirrors 52, and quaternary mirrors 60, respectively, are arranged. The secondary, tertiary, and quaternary mirrors are positioned to receive the light reflected by the primary mirrors and steer it for incidence on camera system 70 located at a detector plane 90.

Figure 5:
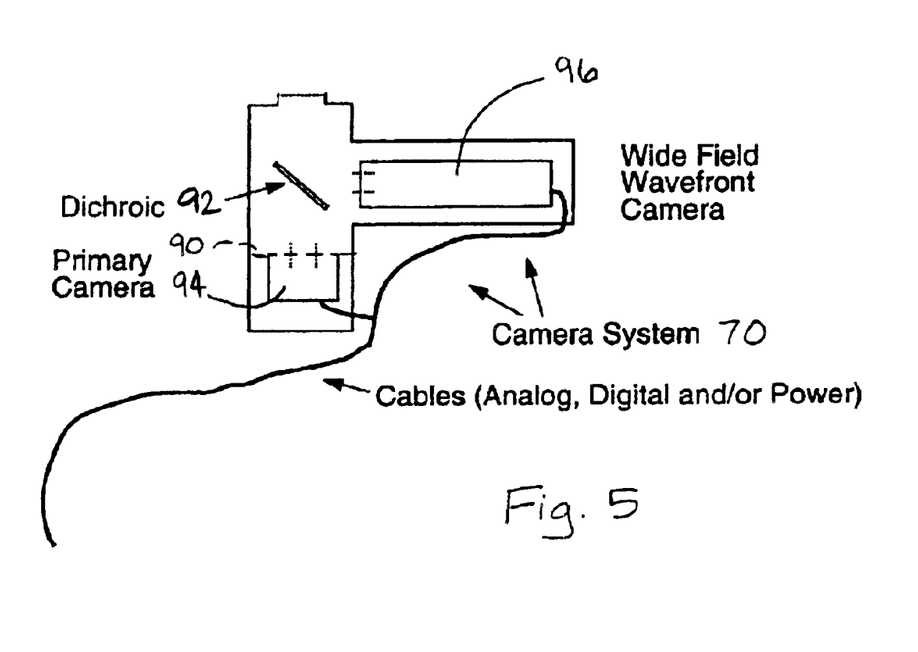
FIG. 5 is a block diagram of a camera system positioned at the detector plane shown in FIG. 4.

FIG. 5 shows that camera system 70 includes a dichroic optical element 92 that splits the incident light into two components and directs them to a primary camera 94 and a wavefront sensing system 96. Camera system 70 can be implemented with a primary camera 94 having a beam splitter that further divides the incident beam component into, for example, four components that each strike a different one of four detector elements. (The term "detector" as used herein refers to either a single detector element or multiple detector elements.) A preferred detector element is a charge-coupled device (CCD) of a channel amplification type, which enables high frame rate (i.e., at least 5 frames/second and nominally up to 100 frames/second) light pattern information acquisition. A suitable CCD detector element is an L3Vision CCD87 512×512 array with in-channel amplification, manufactured by e2 v technologies. Each detector element preferably views a 20 nanometer-50 nanometer bandpass image that is tunable over the visible through near-IR spectrum. A primary camera 94 that is capable of imaging multiple spectral bands enables target recognition and other color imaging applications. Wavefront sensing system 96 provides information for optical system focusing and forming an image from the diffraction pattern.

The choices of the numbers of mirrors, distances between adjacent mirrors, mirror sizes, and related optical parameters for this embodiment were governed by a desire for minimal, efficient achievement of full and pseudo-uniform interferometric spatial frequency coverage.

Figure 6:
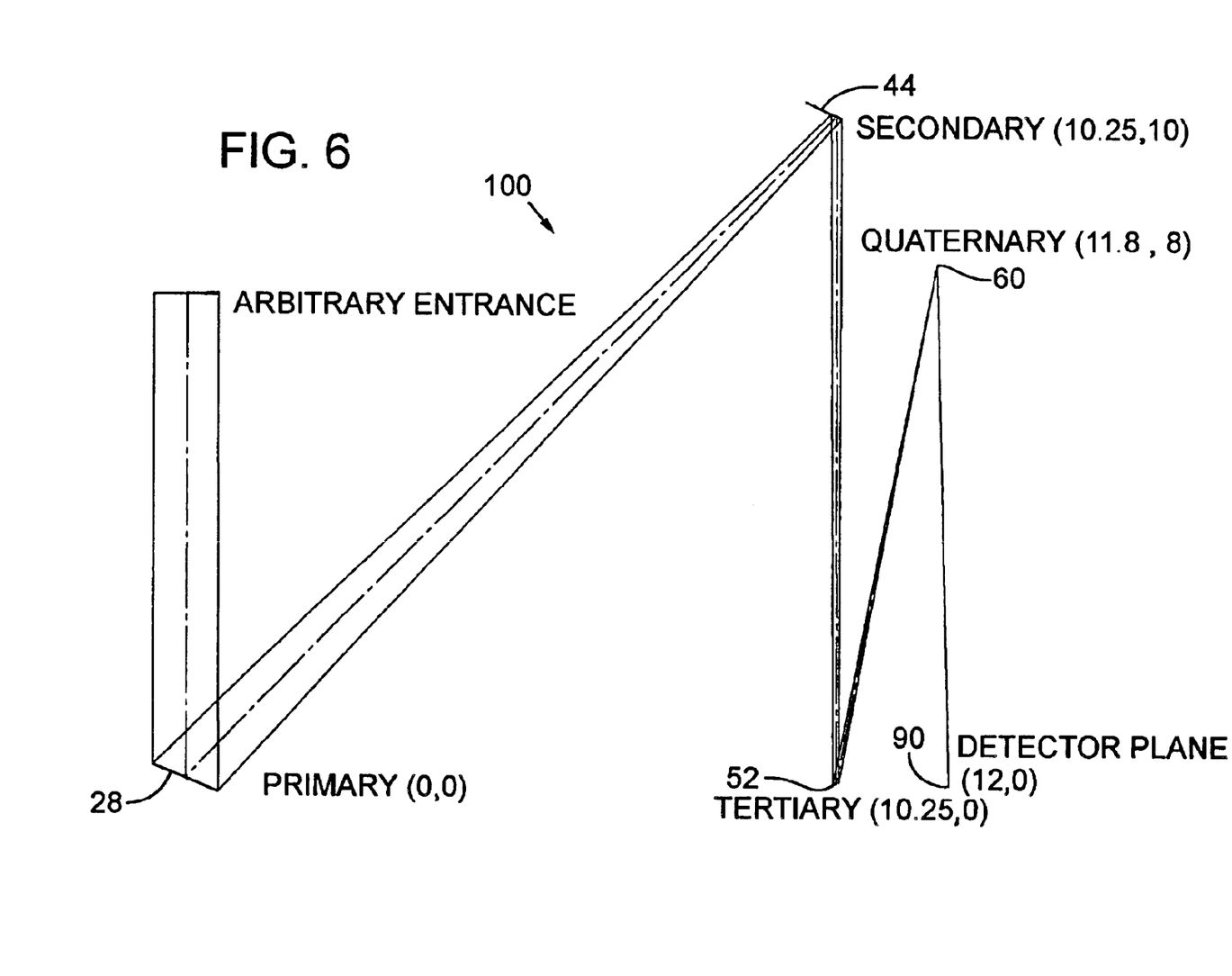
FIG. 6 shows an optical path associated with corresponding mirrors in four sets of mirrors arranging in ring configurations for directing incoming light to an optical detector in accordance with the invention.

FIG. 6 shows a mirror arm 100 defined by a primary mirror 28 and corresponding secondary mirror 44, tertiary mirror 52, and quaternary mirror 60. Mirror arm 100 has an optical path length segment and an effective focal length segment that are adjustable, as will be described below. With reference to FIG. 6, each mirror in mirror arm 100 is given its nominal location in a Cartesian coordinate system in which primary mirror 28 is located at the origin (0,0) and detector plane 90 is located 12 meters to the right at (12,0). Incoming light propagates through an arbitrary entrance and is reflected by primary mirror 28 and intermediate mirrors 44, 52, and 60 to camera system 70 positioned at detector plane 90.

More specifically, primary mirror 28 receives incident incoming light and first reflects it to secondary mirror 44, at location (10.5,10). Secondary mirror 44 reflects the light to tertiary mirror 52 at location (10.25,0), which reflects the light to quaternary mirror 60 at location (11.8,8), which then reflects the light to camera system 70. Skilled persons will appreciate that each primary mirror has a corresponding secondary, tertiary, and quaternary mirror, thereby providing a total of 23 mirror arms configured as depicted in FIG. 6, forming generally concentric rings. Although they are generally concentric, the rings are not all coplanar. As will be evident from the following description, certain of the rings may be tilted, so they need not lie in parallel planes. Moreover, the rings need not be circular. The "generally" concentric qualifier stems for possible small distance lateral shifting of the component rings, resulting in eccentric nesting of the different rings.

The light reflecting surfaces of the primary mirrors are of parabolic shape; and the light reflecting surfaces of the secondary, tertiary, and quaternary mirrors are of pseudo-conic (i.e., aspheric) shape. The mirror element prescription set forth in the table below presents the optical parameters of the mirror elements in each mirror arm 100.

| Mirror Element | Radius of Curvature (mm) | Conic Section Constant | Diameter (mm) |
|---|---|---|---|
| Primary | −29000 | −1 | 1000 |
| Secondary | −4821.8515 | −1.543 | 150 |
| Tertiary | −313087.133 | 1244.587930 | 80–90 |
| Quaternary | −2895.062870 | 3.190692 | 10–20 |

Steering of optical system 10 to point its optical axis 102 at an angle relative to nadir is effected by reorienting primary mirrors 28, each of which can be reoriented, e.g., ±10 degrees, in all directions from its nominal position. Mirror arms 100 meet three conditions to form a coherent diffraction pattern at detector plane 90. These three conditions include nearly identical focal planes, common optical path lengths, and common effective focal lengths. Nearly identical focal planes for mirror arms 100 cause the bundles of light rays to converge to a single, shared three-dimensional spot for the system optical axis. A common optical path length maintains coherence of the light rays at detector plane 90 to provide high frequency detail in the diffraction pattern. A common effective focal length maintains constant lateral magnification.

To simultaneously meet these three conditions, three independent variables are controlled, namely, the positions of the secondary, tertiary, and quaternary mirrors. The secondary and quaternary mirrors are associated with positioning systems permitting lateral motions up to about ±20 centimeters and about ±5 centimeters, respectively. The tertiary mirrors are associated with positioning systems permitting lateral motions of up to ±1 meter. In addition to the lateral movements of the secondary, tertiary, and quaternary mirrors, the plane of the secondary mirror ring structure can be tilted by a mechanism that moves inner surface 40 of plate structure 14 supporting secondary mirrors 44. The plane of the tertiary mirror ring structure can similarly be tilted by a separate mechanism that moves top surface 50 of a ring-shaped plate (not shown) supporting tertiary mirrors 52. Whether the plane of quaternary mirror ring structure is equipped with a tilt mechanism would be a mechanical design option.

In the illustrated preferred arrangement of optical system 10, central hub 12 may have a radius of 1 meter, and tertiary mirrors 52 form a ring with a nominal radius of 1.75 meters. The tertiary mirrors mounted on top surface 50 of a ring-shaped plate can be moved laterally relative to hub 12 and thereby permit eccentric placement of the ring of tertiary mirrors 52 around the hub 12, and be moved relative to the hub by tip and/or tilt motion. The lateral and tip/tilt movements of secondary mirrors 44 can be achieved by similar arrangements. Thus, a ring supporting structure can provide coordinated movement of all of the mirrors of a ring in lateral and tip/tilt directions.. (In some arrangements, tip/tilt control of the secondary mirrors can be omitted).

Tertiary mirrors 52 in one implementation are mounted on a linear, piston-driven actuator that permits ±1 meter of vertical movement of top surface 50. In this arrangement, the single piston moves all 23 of tertiary mirrors 52. Each tertiary mirror 52 can also be provided with small scale positioning systems for precise vertical positioning from the baseline provided by the shared piston. Each tertiary mirror 52 on the shared piston also has separate tip/tilt control. Alternatively, instead of employing a single, shared vertical positioning system (with fine individual adjustments), each tertiary mirror 52 can be mounted on its own linear actuator, thereby permitting independent movement.

Quaternary mirrors 60 are set to positions dictated by the particular placement and orientation of the primary, secondary, and tertiary mirrors to which each quaternary mirror 60 corresponds. As such, the quaternary mirrors 60 typically use highly customized positioning. While a movable ring support structure as described for the secondary and tertiary mirrors may be employed for gross positioning, the position of each quaternary mirror 60 may be sufficiently independent such that coordinated movement of the 23 mirrors by a movable support ring offers little benefit. In the depicted arrangement, the support structure for the quaternary mirrors 60 is static and each quaternary mirror 60 is provided with its own positioners. The quaternary mirrors are generally associated with a position configured to adjust focus only.

Figure 7:
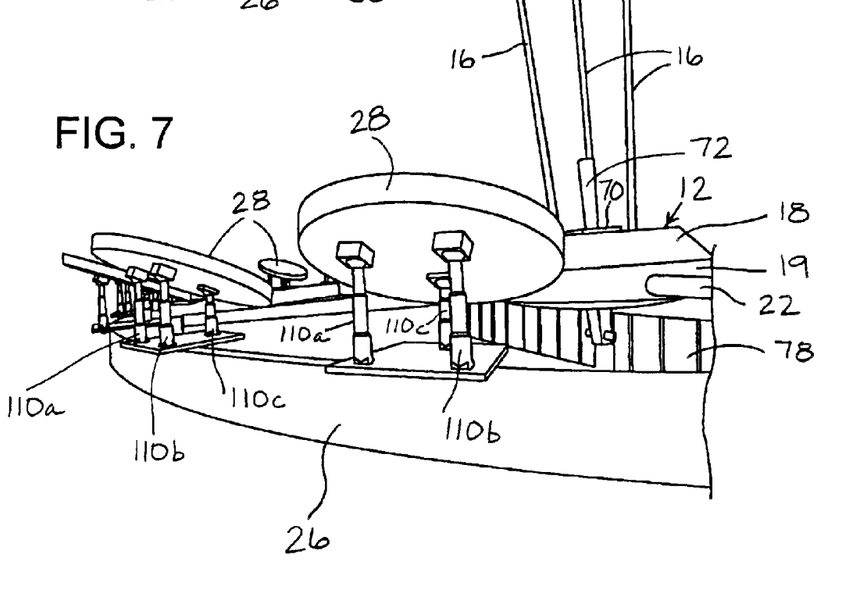
FIG. 7 is an enlarged fragmentary perspective view of several primary mirrors, each attached to three positioning devices mounted to a ring truss on the optical system of FIG. 1.

FIG. 7 shows with reference to primary mirrors 28 (with fairings 30 removed for clarity) mounted on ring truss 26 an exemplary positioning system implementation that can accomplish individual tip/tilt and linear adjustment for each mirror. Although it is shown with respect to primary mirrors 28, this positioning system can also be implemented with the secondary, tertiary, and quaternary mirror ring structures. With reference to FIG. 7, each of three extensible pistons 110a, 110b, and 110c has one end mounted in a spherical bearing joint on the bottom side of fairing 30 of mirror 28 and the other end fixed to a plate 112 mounted on ring truss 26. Changing the lengths of extensible pistons 110a, 110b, and 110c by equal amounts linearly adjusts the vertical distance between the mirror 28 connected to them and ring truss 26 and thereby adjusts the optical path length of the mirror arm 100 to which mirror 28 is associated. Changing the lengths of extensible pistons 110a, 110b, and 110c by different amounts accomplishes tip/tilt positioning of mirror 28 connected to them. (In the preferred embodiment described, primary mirrors 28 undergo only tip/tilt positioning.) Skilled persons will appreciate that the tip/tilt positioning of primary mirrors 28 contributes significantly to an angular momentum vector that would tend to tip the mass of the entire structure of optical system 10. Ensuring the conservation of angular momentum would maintain the pointing direction stability of optical system 10 under such conditions. This can be accomplished by the use of countermasses producing an angular momentum vector of opposite direction to that produced by primary mirror movement and other sources of residual angular momentum offset. In other words, these same principles apply to all masses that move and generate an angular momentum vector.

It will be appreciated that positions of the secondary mirrors depend on position of the primary mirrors, and that the positions of the tertiary mirrors depend on the positions of the primary and secondary mirrors. Control arrangements may be devised that mechanically couple movement of secondary mirrors 52 to primary mirrors 28 to achieve at least gross positioning. Such control systems are simplified if the relationship of the movements of the components are linear. Nonlinear relationships can be addressed by screw driven cams and similar types of positioning mechanisms.

Figure 8:
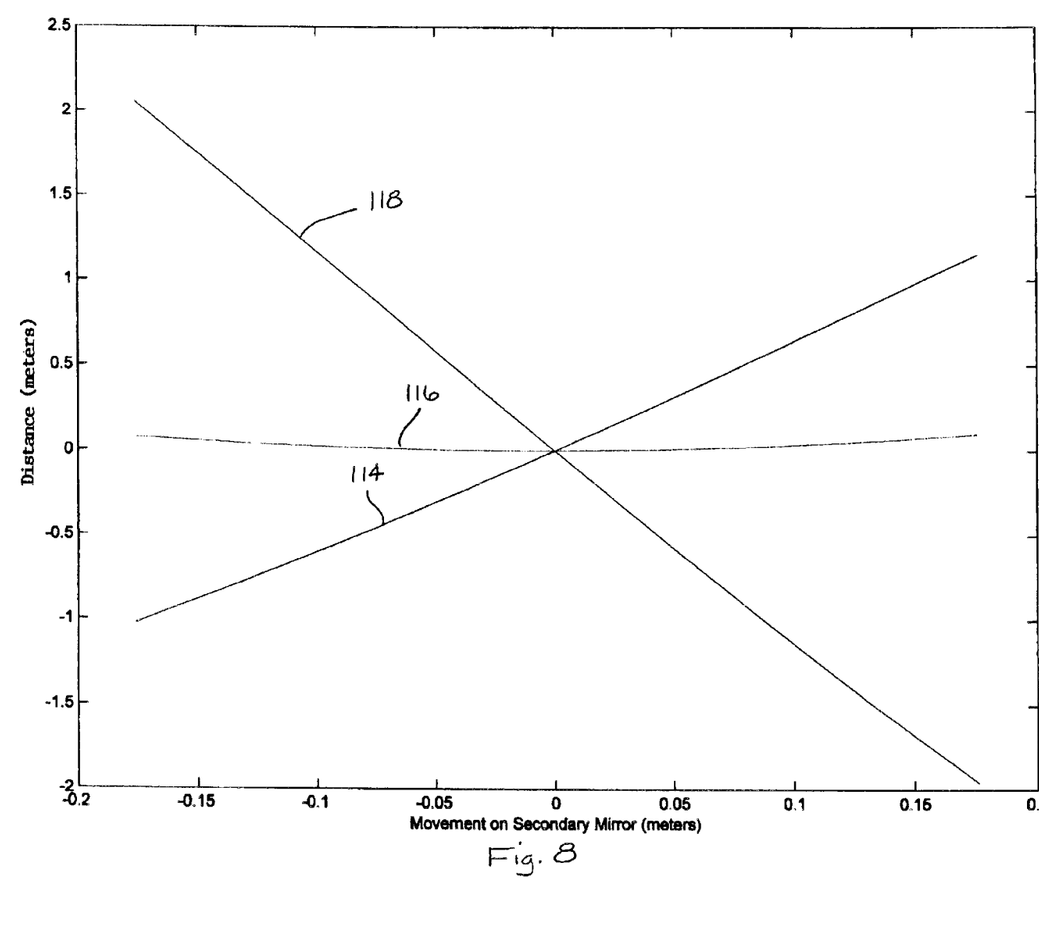
FIG. 8 is a graph showing optical path length relative to nadir in operation of the positioning of the mirrors of the optical system of FIG. 1.

FIG. 8 is a graph showing the optical path length of optical system 10 relative to nadir and the corresponding movements of secondary mirror 44, tertiary mirror 52, and quaternary mirror 60 required to adjust their corresponding optical path length contributions to their associated mirror arm 100 in response. The abscissa represents the position value of secondary mirror 44, and the ordinate indicates the position value of each of tertiary mirror 52 and quaternary mirror 60. (Primary mirror 28 performs only tip/tilt movement in this example.) Curve 114 and curve 116 represent the corresponding movements of tertiary mirror 52 and quaternary mirror 60, respectively, in response to movement by secondary mirror 52. Curve 118 represents the optical path length of the mirror arm 100 to which the primary, secondary, tertiary, and quaternary mirrors are associated. For example, if there is a command to point system optical axis 102 5-degrees from nadir, optical system 10 specifies from memory storage the corresponding optical path length, individually for each of the 23 mirror arms 100. FIG. 8 provides motion curves that specify the position values of each of secondary, tertiary, and quaternary mirrors to adjust their corresponding optical path length contributions to their associated mirror arm 100 in response to the command.

Primary mirrors 28 are mounted on tip/tilt positioners to provide their steering capability. Redundant positioning systems may be employed in anticipation of failures of certain systems in long-term space environments. Thus, a tip-controlling motor may be mounted on a stage controlled by a tilt-controlling motor, which in turn is mounted on top of a second tip-controlling motor, which in turn is mounted on a third tilt-controlling motor. The last two motors would generally remain unused; however, if the first tip/tilt motors fail, the underlying tip/tilt motors can be used to preserve complete operation. In addition, or in the alternative, the motors that control the tip/tilt motions (e.g., through worm gears) can employ redundant motor windings, so that if one motor winding fails, the control system can switch to the backup winding. Loss of mirrors is akin to shuttering small parts of the aperture of the optical interferometer. Resolution would be somewhat impaired if many adjoining mirrors are lost, but overall optical system performance would not be seriously degraded until about 15 of the mirror arm paths are in operation. If operating in a motion target indicator mode, in which moving objects are detected (i.e., no image formation), optical system 10 can function with as few as 10 mirror arm paths in operation.

Figure 9:
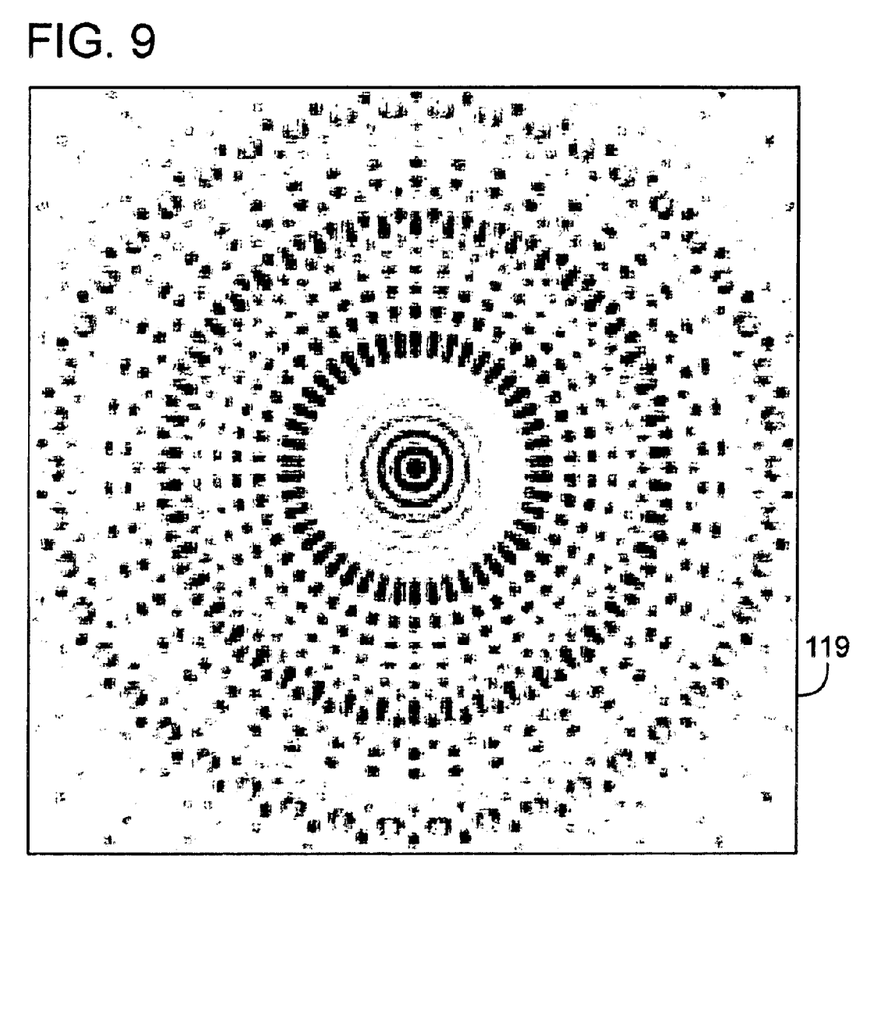
FIG. 9 is an exemplary diffraction pattern formed at the detector plane of the optical system of FIG. 1.

When the beams from the 23 primary mirrors are superimposed on the optical detector, a diffraction pattern results in the form of a complicated point spread function. Slight imperfections in the tip/tilt and optical path length adjustment mechanisms characterizing the state of the optical system also complicate the point spread function. This pattern is characterized and compensated-for to yield a final image by practice of known techniques taught by applicant's '227 patent. FIG. 9 shows an exemplary diffraction pattern 119 formed on the light receiving surface of optical detector 70. Wavefront sensing system 96 (FIG. 5) detects biases and misalignments of optical system 10, and the '227 patent teaches techniques for measuring the biases and misalignments and how to correct for them. The '227 patent particularly concentrates on the wavefront sensing of low contrast, extended scenes and their notorious difficulties in achieving focus.

From geostationary orbit, it appears that the interferometric optical system described above can achieve an imaging resolution on the order of approximately 0.8 meter. If placed ten times closer to Earth, a resolution ten times greater could be achieved.

Skilled persons will appreciate that, although the preferred embodiment described is implemented with certain degrees of movement (tip/tilt/lateral/vertical) for different mirrors, other embodiments can employ different combinations of movements (including movement of the detector). More generally, while the detailed arrangement employs four sets of mirror (primary, secondary, tertiary, and quaternary), other embodiments can employ more or fewer mirror sets.

An implementation using a single quaternary mirror 60 with a tip/tilt positioning device (possibly in association with a linear piston (focusing) positioning device) may be substituted for a mirror ring to reduce cost. The effect would be to constrain the quaternary mirror to linear motion at the expense of complicating the shapes of curves 114 and 116 representing the positioning of the tertiary mirror 52 and quaternary mirror 60, respectively.

The invention described above was in the context of an orbiting earth-imaging optical interferometer; however, the same arrangement can be pointed to image astronomical subjects. Such an optical interferometer can also be terrestrially based and used to image subjects in and beyond the atmosphere.

Figure 10:
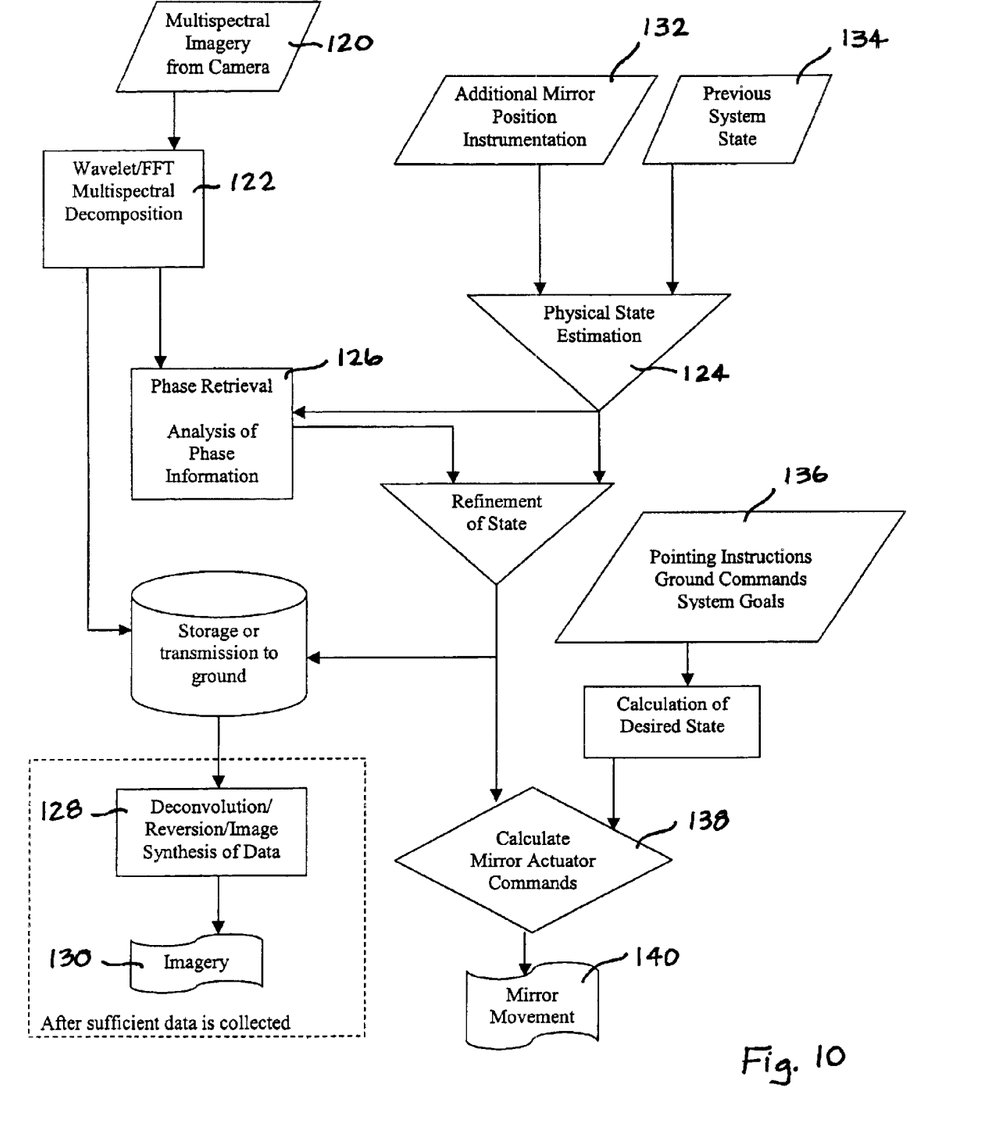
FIG. 10 is a synoptic flow diagram of the primary information and control processes underpinning the dynamic function of the invention.

FIG. 10 is a synoptic flow diagram that summarizes the primary information and control processes underpinning the dynamic function of the invention. The corresponding process blocks are noted in parentheses in the following description.

Instead of taking single images by a "dwelling" detector, as is typical of prior art sparse array designs, primary data are gathered using a high frame rate stream of primary detector interferometric data from multiple spectral bands (120). Attempting to form a single image would produce the same blurry image typical of ground-based astronomy looking through the atmosphere. The primary data are first decomposed into wavelet-like, spatial-spectral data (122), which are then delivered to three cascaded data processing units. They include a forward and backward physical state estimation unit (124), which drives a physical figure (i.e., overall mirror position) control "phasing" system (126). The phasing system not only supports actual figure control but also provides time-delayed "best estimate" physical state information to an image synthesis processing unit (128). The image synthesis processing unit references raw data from the primary sensors against "best estimate biases" synthesized from the raw information of the figure control phasing system and physical state estimation unit, ultimately forming a single high-resolution image of the object/scene (130).

The inclusion of independent wavefront sensors or on-board position sensors (132, 134), together with pointing instructions (136), provide data that improve the physical figure control system and/or the best estimate biases. This facilitates constant correction of the satellite and thereby contributes to calculation of mirror actuator commands (138) for the desired overall mirror movement (140). Wavefront sensing system 96 of FIG. 5 (operating in accordance with teachings of the '227 patent) contributes to the mirror position instrumentation indicated in process block 132 of FIG. 10. Other potential possible contributors to the mirror position instrumentation include on-board laser positioning devices.

It will be obvious to those having skill in the art that many changes may be made to the details of the above-described embodiment of this invention without departing from the underlying principles thereof. The scope of the invention should, therefore, be determined only by the following claims.

What is claimed is:

1. A multi-aperture interferometric optical system formed of multiple sets of mirrors mounted on support structures operatively coupled to a platform, the optical system defining a system optical axis and the multiple sets of mirrors cooperating to point the system optical axis at an angle relative to nadir without moving the platform on which the optical system is supported, comprising:

a first set of primary mirrors arranged along a first periphery to receive incident electromagnetic radiation propagating from a target subject to be imaged, the primary mirrors operatively associated with a first positioning mechanism to effect directional pointing of the system optical axis toward the target subject;

a detector configured to acquire radiation pattern information from the electromagnetic radiation received from the target subject;

a second set of secondary mirrors arranged along a second periphery and a third set of tertiary mirrors arranged along a third periphery, the second and the third sets of mirrors positioned to receive electromagnetic radiation reflected by the primary mirrors receiving the incident electromagnetic radiation and to steer the reflected radiation for radiation pattern information acquisition by the detector, the second and the third sets of mirrors being operatively associated with second and third positioning mechanisms to contribute to adjustment of optical path lengths and preservation of a common effective focal length of the radiation reflected by the primary mirrors and incident on the detector; and a quaternary mirror set positioned to receive the radiation steered by the second and third sets of mirrors and direct it toward the detector for radiation pattern information acquisition.

2. The optical system of claim 1, in which the angle relative to nadir ranges from zero degrees to about 10 degrees.

3. The optical system of claim 1, in which each primary mirror in the first set has a corresponding secondary mirror and a corresponding tertiary mirror that define a mirror arm having an optical path length segment and an effective focal length segment, the second and third positioning mechanisms operatively associated with the corresponding secondary and tertiary mirrors providing adjustment of the optical path length and effective focal length segments.

4. The optical system of claim 3, further comprising a controller operatively associated with the second and third positioning mechanisms to adjust the optical path length and effective focal length segments of the mirror arms to achieve a common pointing path along the system optical axis at the angle relative to nadir.

5. The optical system of claim 3, in which failure of a mirror in one of the first, second, and third sets defining a mirror arm interrupts propagation of radiation along the mirror arm to the detector.

6. The optical system of claim 1, in which:
   each of the first, second, and third peripheries is in the form of a ring; and
   adjacent mirrors in the first, second, and third sets are mutually spaced apart from each other by nonuniform distances.

7. The optical system of claim 1, in which the detector includes multiple detector elements each viewing a radiation pattern bandpass of predetermined wavelength range.

8. The optical system of claim 7, in which the radiation pattern bandpasses range from visible light to the near-infrared light.

9. The optical system of claim 1, in which the detector comprises a charge-coupled device of a channel amplification type.

10. The optical system of claim 1, in which each of the second and third positioning mechanisms comprises an extensible piston mechanism.

11. The optical system of claim 1, in which the first, second, and third sets of mirrors are arranged such that the positions of the secondary mirrors depend on the positions of the primary mirrors and in which the positions of the tertiary mirrors depend on the positions of the primary mirrors and secondary mirrors to point the system optical axis at the angle relative to nadir.

12. The optical system of claim 1, in which the quaternary mirror set includes multiple quaternary mirrors arranged along a periphery to receive electromagnetic radiation reflected by the tertiary mirrors.

13. The optical system of claim 1, in which the quaternary mirror set includes a single quaternary mirror positioned to receive electromagnetic radiation reflected by the tertiary mirrors.

* * * * *